Patented July 10, 1951

2,559,594

UNITED STATES PATENT OFFICE 2,559,594

DISTILLATION OF ACID-TREATED CASHEW NUT SHELL LIQUID

Solomon Caplan, New York, N. Y., assignor to The Harvel Corporation, a corporation of New Jersey No Drawing. Application January 27, 1948, Serial No. 4,713

3 Claims. (Cl. 202—10)

This invention relates to novel methods of processing cashew nut shell liquid and to novel products produced thereby. More particularly this invention is directed to novel methods of processing cashew nut shell liquid in the production of distillates and residues thereof and to novel products produced thereby.

In the course of my experimentations with raw cashew nut shell liquid, I have discovered that the color as well as the color stability of the distillates recovered therefrom may be greatly enhanced, the percentage of clear distillates obtained therefrom may be materially increased and the viscosity at 25° C. of the residues obtained therefrom may be greatly reduced even when they measure less than 45% by weight based on the weight of the cashew nut shell liquid from which they have been derived. These improved distillates and residues may be obtained from cashew nut shell liquid starting material having particular and predetermined characteristics compared to the characteristics of the cashew nut shell liquid from which it has been derived. The starting material, which is subjected to distillation so that these improved distillates and residues may be obtained, is treated cashew nut shell liquid substantially free from the nitrogenous and mineral components normally present in raw cashew nut shell liquid and having a viscosity at 25° C. no greater than that of the raw cashew nut shell liquid at the same temperature. Besides obtaining these novel products therefrom, the distillation procedure is more uniform and in addition there is substantially no foaming during the process.

The starting material may be prepared in the manner described in my application of even date Serial No. 4,695. As described therein, a quantity of cashew nut shell liquid is mixed with an aqueous solution of an acidic agent having an ionization constant at least as great as $1.75 \times 10^{-5}$. Illustrative examples of said agents are acetic acid, hydrochloric acid, sulphuric acid, sodium acid sulphate, etc. The concentration of said acidic agent in said aqueous solution is below that necessary to cause appreciable polymerization or thickening of the raw cashew nut shell liquid under the conditions of treatment which may vary. The ratio by weight in said mixture of said acidic agent to the raw cashew nut shell liquid therein is the chemical equivalent of at least .2 part of sulphuric acid to 100 of cashew nut shell liquid and preferably .4 part of sulphuric acid to 100 of cashew nut shell liquid and may be as high as desired, although in factory practice does not exceed 2 parts of sulphuric acid to 100 of cashew nut shell liquid. The ratio by weight of the water in said aqueous solution to the cashew nut shell liquid to be treated is preferably at least 10-100 and may be high as desired and in factory practice is usually in the range of 20-100 to 100-100.

Employing the aforesaid ratios, the cashew nut shell liquid is intimately mixed with said aqueous solution of an acidic agent, whereupon the mineral components and also the nitrogenous components react with or form addition products or salts with the acidic agent and dissolve in the aqueous medium. This treatment of the raw cashew nut shell liquid with the said acidic agent may be conducted at temperatures between that just slightly above the freezing point of water and 350° F. and under atmospheric pressure as well as superatmospheric pressure conditions. However, I prefer that this treatment be conducted at atmospheric pressure and temperatures between 60°-210° F. Then if no external heat has been applied the mass is heated to a temperature between 120°-210° F. in order to break any emulsion which may have formed during the mixing step and the mass is allowed to stand, whereby it cools to room temperature and separates into two main layers, an aqueous layer and a treated cashew nut shell liquid layer. After the separation has been attained, the treated cashew nut shell liquid containing 0-2% water is removed from the aqueous layer in any desired manner, by drawing off either the treated cashew nut shell liquid layer or the aqueous layer, for example. This aqueous layer now contains in solution the salts of mineral and nitrogenous components originally present in the raw cashew nut shell liquid. If desired, the entire procedure may be carried out at room temperature without the application of any external heat. When no heat is employed, emulsions are formed and they may be centrifuged, whereby the resultant treated cashew nut shell liquid containing 0-2% water is removed from the aqueous component. When it is not desired to use the centrifuging step, a sharp separation may be obtained by employing an organic solvent for the treated cashew nut shell liquid. In any case, the aqueous component is removed from the cashew nut shell liquid phase and contains the mineral and nitrogenous components of raw cashew nut shell liquid, all of which are in solution in the water. The nitrogenous compounds may be recovered from the aqueous solution if desired. When no organic solvent is used, the cashew nut shell liquid phase which has been separated from the aqueous solution usually contains 0–2% of water. This product is heated under reduced pressure conditions to drive off the water without increasing the viscosity at 25° C. above that of the raw cashew nut shell liquid. Generally temperatures of 200–220° F. and pressures below 50 mm. of mercury pressure are employed for this purpose. During the treatment of the raw cashew nut shell liquid as well as the removal of the treated cashew nut shell liquid which is the non-aqueous phase from the aqueous phase, the pH of the aqueous phase is always maintained at a value never below that of the aqueous solution of the acidic agent mixed with the cashew nut shell liquid and preferably above that necessary to increase the viscosity at 25° C. above that of raw cashew nut shell liquid at 25° C. when the mixture is maintained at 200° F. for 3 hours. By removing the aqueous phase in these various ways, nitrogenous and mineral components of raw cashew nut shell liquid and/or reaction or addition products of said components with the acidic agent are in solution in said aqueous phase and consequently are removed as part thereof. In this way, the aqueous phase is removed from the cashew nut shell liquid without decreasing the pH of the aqueous phase.

The raw cashew nut shell liquid which may be treated according to this invention is any raw cashew nut shell liquid however obtained and whether partially or completely decarboxylated. It may be the raw cashew nut shell liquid containing a large proportion of anacardic acid and obtained by the extraction of cashew nut shell liquid by the cold extraction or solvent extraction method or it may be the cashew nut shell liquid of commerce generally obtained by the hot extraction method of the type set forth in the U. S. patent to E. R. Hughes, No. 2,058,456 and containing a very small percentage of anacardic acid, or it may be either of these particular types which have been partially or completely decarboxylated.

The following Examples 1–8 are given by way of illustrating specific ways of producing the starting materials but are not to be regarded in a limiting sense:

*Example 1*

500 grams raw cashew nut shell liquid 200 grams aqueous solution H₂SO₄ containing 10% H₂SO₄ are placed in a lead lined autoclave equipped with an agitator. The mixture is heated with constant stirring to a temperature of about 300–325° F. whereupon the guage pressure indicates 70 lbs. per square inch. The heating and stirring are stopped and the mass is allowed to cool to room temperature. The mass is then found to have separated into two main layers: an aqueous layer and a non-aqueous layer of cashew nut shell liquid. The aqueous layer is drawn off. A comparison of the viscosity of the raw cashew nut shell liquid with that of the so-treated cashew nut shell liquid is as follows:

Viscosity of raw cashew nut shell liquid_____ 172 cp. at 25° C.
Viscosity of treated cashew nut shell liquid_____ 110 cp. at 25° C.

*Example 2*

500 grams raw cashew nut shell liquid
200 grams aqueous solution H₂SO₄ containing 5% H₂SO₄ are placed in an autoclave and heated therein with constant stirring until the pressure is 55 lbs. per square inch. Heating and stirring are stopped and the mass is allowed to cool to room temperature whereupon it separates into two main layers: an aqueous layer and a non-aqueous cashew nut shell liquid layer. The aqueous layer is removed. A comparison of the viscosity of the raw cashew nut shell liquid with that of the so-treated cashew nut shell liquid shows:

Viscosity of raw cashew nut shell liquid_____ 265 cp. at 25° C.
Viscosity of treated cashew nut shell liquid_____ 188 cp. at 25° C.

*Example 3*

500 grams raw cashew nut shell liquid are treated with 200 grams of an aqueous solution of H₂SO₄ containing 2% H₂SO₄ in the same manner as that set forth in Example 2. A comparison of the viscosity of the raw cashew nut shell liquid with that of the so-treated cashew nut shell liquid gave the following results:

Viscosity of raw cashew nut shell liquid_____ 222 cp. at 25° C.
Viscosity of treated cashew nut shell liquid_____ 124 cp. at 25° C.

*Example 4*

500 grams of raw cashew nut shell liquid are treated with 200 grams aqueous solution of HCl containing 10% HCl in the same manner as that set forth in Example 2. Comparison of the viscosity of the raw cashew nut shell liquid with that of the treated cashew nut shell liquid showed:

Viscosity of raw cashew nut shell liquid_____ 222 cp. at 25° C.
Viscosity of treated cashew nut shell liquid_____ 184 cp. at 25° C.

*Example 5*

500 grams portions of raw cashew nut shell liquid were treated with 200 cc. portions of aqueous solution containing the following acids in the percentages indicated and following the procedure set forth in Example 2.

| | Per cent |
|---|---|
| Dichloracetic acid | 4 |
| Dichloracetic acid | 3 |
| Monochloracetic acid | 3 |
| Phosphoric acid | 5 |
| Phosphoric acid | 2 |
| Acetic acid | 3 |
| Acetic acid | 2 |

Treated cashew nut shell liquids were produced whose viscosities were in every instance lower than that of the raw cashew nut shell liquid employed.

*Example 6*

The proportions of materials being the same as those set forth in the preceding examples and carrying out the mixing at room temperature in each instance and then thereafter breaking the resultant emulsions by heating preferably at a temperature between 120–210° F. and then allowing the mass to stand, it will separate into two main layers. After the water layer has been removed in each instance the resultant so-treated cashew nut shell liquid will be found to have a reduction in viscosity of more than 10% when compared to the viscosity of the raw cashew nut shell liquid employed.

Example 7

4 lbs. concentrated $H_2SO_4$ were dissolved in 100 lbs. water and this solution was added to 400 lbs. raw cashew nut shell liquid. This mixture was agitated thoroughly for 15 minutes whereupon an emulsified mixture was produced. To said emulsified mixture were added 200 lbs. alcohol and 50 lbs. toluene and this mixture is thoroughly agitated for about 10 minutes. The foregoing procedure is carried out at room temperature and at room temperature the mass is allowed to stand for 16 hours whereupon it separates into two layers. The lower aqueous layer was withdrawn and the solution of the cashew nut shell liquid in the solvents was heated under sub-atmospheric pressure conditions and at a temperature below 200° F. whereupon the solvents were distilled off leaving behind a treated cashew nut shell liquid. A comparison of the viscosity of the raw cashew nut shell liquid with the treated cashew nut shell liquid showed:

Viscosity of raw cashew nut shell liquid_____ 265 cp. at 25° C.
Viscosity of treated cashew nut shell liquid_____ 160 cp. at 25° C.

Example 8

75 lbs. of concentrated $H_2SO_4$ were dissolved in 2500 lbs. of water and this solution was added to 6200 lbs. of raw cashew nut shell liquid at room temperature. This mixture was thoroughly agitated for about two hours during which time the temperature of the mass was increased to about 200° F. Then agitation was stopped and heating continued to maintain the temperature of the mass at 200° F. for an additional 4 hours. Then the external heat was removed and the mass was allowed to cool overnight whereupon it separated into two main layers: an aqueous and a treated cashew nut shell liquid layer. The cashew nut shell liquid was removed from the aqueous layer. Comparison of the viscosity of the raw cashew nut shell liquid with that of the treated cashew nut shell liquid showed:

Viscosity of raw cashew nut shell liquid _____ 436 cp. at 25° C.
Viscosity of treated cashew nut shell liquid _____ 244 cp. at 25° C.

By following the teachings of this invention as exemplified in Examples 1-8 there may be produced treated cashew nut shell liquid which is substantially free of the nitrogenous and mineral components normally present in raw cashew nut shell liquid and having a viscosity characteristic at 25° C. no greater than that of the raw cashew nut shell liquid before the removal of said components therefrom.

The various treated cashew nut shell liquids of Examples 1-8 are substantially free of water and also of nitrogenous and mineral components normally present in raw cashew nut shell liquid and capable of being precipitated by means of diethyl sulphate. If it is desired to remove all traces of those components, the treated cashew nut shell liquid of Examples 1-6 and 8 may be water washed one or more times. If it is desired to remove all traces of water which may be present, the cashew nut shell liquid of Examples 1-6 and 8 which may or may not have been water washed may be processed in various ways whereby they may be completely dehydrated without increasing the viscosity thereof at 25° C. above that of the raw cashew nut shell liquid from which it was derived. One method, for example is to heat the treated cashew nut shell liquid at about 200° F. under reduced pressure of below 50 mm. of mercury. Another method is to heat a layer of treated cashew nut shell liquid for a short period at 300° F. In any case the time of heating is such that the water is completely eliminated therefrom without increasing its viscosity at 25° C. above that of the raw cashew nut shell liquid from which it was derived.

According to this invention the treated cashew nut shell liquid is distilled at elevated temperatures and under reduced pressure to provide novel and improved distillates and residues. In carrying out this invention, I prefer that the treated cashew nut shell liquid be completely dehydrated before proceeding with the distillation, and with care being taken in the dehydration step so that the viscosity of the completely dehydrated product be no greater than the raw cashew nut shell liquid from which it was derived. The distillation is preferably carried out in a temperature range of 475° to 580° F. and at a reduced pressure no greater than 20 mm. and generally 1–15 mm. of mercury pressure. By following this procedure it is possible to obtain distillates having boiling point of approximately 225° C. at 10 mm. of mercury pressure and consisting chiefly of anacardic phenol, generally characterized as phenol having in the meta position 15 carbon atom unsaturated hydrocarbon substituents, whose unsaturation is due to one or more ethylenic linkages.

The surprising advantages inherent in the employment of said treated cashew nut shell liquids in the production of the distillates and residues are (1) the recovery of high percentage of distillate which may be more than 50% of the weight of the treated cashew nut shell liquid being distilled, of said distillate which is of light color and has relatively good color stability, (2) the recovery of residues liquid at room temperature even when the percentage of residue is as low as 35% of the weight of the treated cashew nut shell liquid being distilled, (3) lower temperatures may be employed to recover a particular quantity of distillate when operating under the same pressure conditions, (4) the time of distillation may be greatly reduced, (5) a clear solution may be obtained when only four parts of one of said distillates is combined with 1 part of Derris resin (rotenone containing insecticidal agent derived from Derris root) and diluted with ten volumes of a hydrocarbon mineral oil fraction, such as kerosene, (6) the distillates may be more readily hydrogenated, (7) there is a very low loss of volatiles.

The following is an example which is given merely to illustrate the invention and is not to be regarded in a limiting sense because any of the treated cashew nut shell liquids might be employed to provide the novel distillates and residues by following the general procedure of this example where comparatively low temperatures are employed and time of distillation is comparatively short for the production of large percentages of distillates.

Example 9

500 grams of the treated cashew nut shell liquid having a viscosity of 160 centipoises at 25° C. and produced according to Example 7 was placed in a two liter flask connected to a vacuum line and to a condenser terminating in a receiving chamber. The pressure within the flask was reduced and the temperature of the mass therein was increased and distillation was carried out as follows:

| Time | Temperature (°F.) of liquid in the flask | Mm. of Hg pressure in the flask | Remarks |
|---|---|---|---|
| 2:15 | Below 480 | 0.3 | |
| 2:20 | 480 | 4.5 | Distillation begins. |
| 2:25 | 494 | 5.0 | |
| 2:30 | 494 | 5.0 | |
| 2:35 | 505 | 4.5 | |
| 2:38 | 522 | 4.5 | Shut off gas. |

The distillate collected was light straw color and had excellent color stability darkening only slightly in the course of several weeks. The quantity of said distillate collected measured 310 grams. The residue was liquid at room temperature and measured 186 grams. There was a loss of only 4 grams.

I claim:

1. The method comprising distilling treated cashew nut shell liquid substantially free of nitrogenous and mineral components normally present in raw cashew nut shell liquid and whose viscosity at 25° C. is no greater than that of the raw cashew nut shell liquid, said distillation carried out under reduced pressure and at elevated temperature and collecting phenolic constituent having an unsaturated hydrocarbon substituent of 15 carbon atoms; said treated cashew nut shell liquid produced by removing from raw cashew nut shell liquid nitrogenous and mineral components normally present therein by mixing said raw cashew nut shell liquid with an aqueous solution of an acidic agent, the ionization constant of said agent being at least $1.75 \times 10^{-5}$, the ratio by weight of said acidic agent to said cashew nut shell liquid of said mix being the chemical equivalent of at least 0.2 part of $H_2SO_4$ to 100, the ratio by weight of the quantity of water in said solution to the quantity of said cashew nut shell liquid being at least 10–100, the concentration of said acidic agent in said solution being below that necessary to increase the viscosity of the cashew nut shell liquid at 25° C. when maintained at 200° F. for 3 hours, and then removing from said mass said treated cashew nut shell liquid whose viscosity at 25° C. is no greater than that of said raw cashew nut shell liquid at the same temperature.

2. The method comprising distilling treated cashew nut shell liquid substantially free of nitrogenous and mineral components normally present in raw cashew nut shell liquid and whose viscosity at 25° C. is no greater than that of the raw cashew nut shell liquid, said distillation carried out at temperatures of 475° F. to 580° F. and reduced pressure no greater than 20 mm. of mercury pressure; said treated cashew nut shell liquid produced by removing from raw cashew nut shell liquid nitrogenous and mineral components normally present therein by mixing said raw cashew nut shell liquid with an aqueous solution of an acidic agent, the ionization constant of said agent being at least $1.75 \times 10^{-5}$, the ratio by weight of said acidic agent to said cashew nut shell liquid of said mix being the chemical equivalent of at least 0.2 part of $H_2SO_4$ to 100, the ratio by weight of the quantity of water in said solution to the quantity of said cashew nut shell liquid being at least 10–100, the concentration of said acidic agent in said solution being below that necessary to increase the viscosity of the cashew nut shell liquid at 25° C. when maintained at 200° F. for 3 hours, and then removing from said mass said treated cashew nut shell liquid whose viscosity at 25° C. is no greater than that of said raw cashew nut shell liquid at the same temperature.

3. A distillate produced according to claim 1.

SOLOMON CAPLAN.

REFERENCES CITED

The following references are of record in the file of this patent:

UNITED STATES PATENTS

| Number | Name | Date |
|---|---|---|
| 2,128,247 | Harvey | Aug. 30, 1938 |
| 2,447,432 | Schaufelberger | Aug. 17, 1948 |